United States Patent [19]

Shibata et al.

[11] Patent Number: 5,726,725
[45] Date of Patent: Mar. 10, 1998

[54] LIQUID CRYSTAL DEVICE AND PROCESS FOR PRODUCTION THEREOF WITH POLYIMIDE ALIGNMENT FILM RUBBED AND THEN BAKED

[75] Inventors: Masaaki Shibata, Yamanishi; Katsutoshi Nakamura, Hiratsuka, both of Japan

[73] Assignee: Canon Kabushiki Kaisha, Tokyo, Japan

[21] Appl. No.: 414,722

[22] Filed: Mar. 31, 1995

[30] Foreign Application Priority Data

Mar. 31, 1994 [JP] Japan .................. 6-083672

[51] Int. Cl.$^6$ .................. G02F 1/1337; G02F 1/141
[52] U.S. Cl. .................. 349/126; 349/124; 349/134
[58] Field of Search .................. 359/75, 76, 78; 349/124, 126, 134, 184

[56] References Cited

U.S. PATENT DOCUMENTS

| | | | |
|---|---|---|---|
| 4,367,924 | 1/1983 | Clark et al. | 350/334 |
| 4,712,875 | 12/1987 | Tsuboyama et al. | 359/76 |
| 5,120,466 | 6/1992 | Katagiri et al. | 359/76 |
| 5,381,256 | 1/1995 | Hanyu et al. | 359/75 |
| 5,528,394 | 6/1996 | Yeoh et al. | 359/100 |
| 5,568,295 | 10/1996 | Nakamura et al. | 359/75 |

*Primary Examiner*—Anita Pellman Gross
*Attorney, Agent, or Firm*—Fitzpatrick, Cella, Harper & Scinto

[57] ABSTRACT

A liquid crystal device including a pair of substrates and a chiral smectic liquid crystal disposed between the substrates, is produced by a process including a step of forming an alignment control film of a polyimide through a sequence of forming a film of a polyimide precursor on a substrate, subjecting a surface of the film to a uniaxial aligning treatment and then baking the film to form an alignment control film.

18 Claims, 4 Drawing Sheets

C1 ALIGNMENT    $(H) + \delta > \alpha$

C2 ALIGNMENT    $(H) - \delta > \alpha$

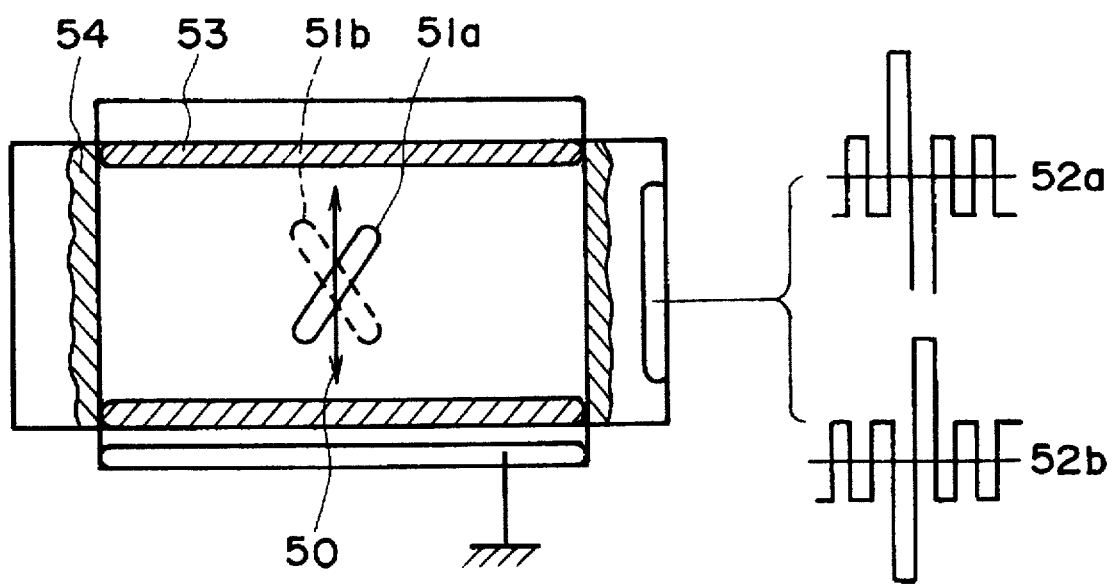
F I G. 5

LIQUID CRYSTAL DEVICE AND PROCESS FOR PRODUCTION THEREOF WITH POLYIMIDE ALIGNMENT FILM RUBBED AND THEN BAKED

FIELD OF THE INVENTION AND RELATED ART

The present invention relates to a liquid crystal device used in display apparatus, liquid crystal optical shutters, etc., particularly a liquid crystal device using a chiral smectic liquid crystal, and a process for production thereof.

A liquid crystal device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure in a certain temperature range and, under this state, shows a property of taking either one of a first optically stable state and a second optically stable state responding to an electrical field applied thereto and maintaining such a state in the absence of an electrical field, namely bistability. The ferroelectric liquid crystal also has a rapid response to the change in electrical field. Thus, it is expected to be utilized in a high speed and memory type display device drivable according to a simple matrix scheme and particularly to provide a large-area, high-resolution display.

The above-mentioned SmC* or SmH* phase of a non-helical structure is realized by disposing a homogeneously and uniaxially aligned ferroelectric liquid crystal layer between a pair of substrates disposed in parallel with a spacing of at most several μm so as to provide a surface stabilized (SS) state. As the method of homogeneously and uniaxially aligning the ferroelectric liquid crystal, there have been known the shear stress application method, the magnetic filed application method, the rubbing method, the oblique evaporation method, etc. In view of the easiness, stability and reproducibility, there has been most popularly practiced the method of rubbing a polyimide film formed on a substrate for uniaxial alignment.

In a liquid crystal device using such a liquid crystal showing chiral smectic phase inclusive of a ferroelectric liquid, it has been desired to develop a technique of appropriately controlling the alignment state to provide a homogenous alignment state, thereby improving the display characteristics, such as a contrast.

Further, in such a liquid crystal device, there have been posed several problems in addition to the alignment technique. One of such problems is occurrence of local coloring or tinging of a display device (generally along a side region thereof) during the drive of the device. The phenomenon is described with reference to FIG. 1A (a plan view of a ferroelectric liquid crystal device) and FIG. 1B (an illustration of liquid crystal molecular behavior in the device).

More specifically, when such a device is continually driven for a long period, a side or edge region 13 of the display area is colored or tinged in yellow. Such a phenomenon not only deteriorates the appearance of the picture but also can change the switching characteristics of the related liquid crystal pixels. It has been found that such a phenomenon has been caused by movement of liquid crystal molecules toward the region 13 to increase the liquid crystal thickness (which may be also called a spacing between the substrates or a cell thickness) at the region 13.

As a result of our study for solving the above problem, we have had a presumption that the liquid crystal is attributable to an electrodynamic effect caused by perturbation of dipole moments of liquid crystal molecules in an AC electric field given by drive pulses. It is also presumed that the liquid crystal molecular movement direction 12a or 12b is dependent on the average molecular axis direction 11a or 11b in combination with a rubbing direction 10 as shown in FIG. 1B.

As the liquid crystal molecular movement direction depends on the rubbing direction and in view of the fact that the pretilt state of liquid crystal molecules at the substrate boundaries is determined by the rubbing, it is presumed that the liquid crystal molecular movement depends on the pretilt state or the direction of bending of smectic layers which is caused so as to be stable due to an elastic energy change caused by the pretilt.

Further, there has been also found a tendency that the direction and raze of the liquid crystal movement are changed depending on the magnitude of a boundary controlling force controlled by the rubbing treatment described above. It is however difficult to suppress the liquid crystal molecular movement within a tolerable extent while retaining the good alignment of the liquid crystal by simply increasing or decreasing the rubbing intensity, as by changing the rotation speed of a rubbing roller, the pressing depth of a rubbing cloth onto a substrate, etc.

SUMMARY OF THE INVENTION

In view of the above-mentioned problems, an object of the present invention is to provide a liquid crystal device using a chiral smectic liquid crystal and showing an excellent durability wherein a homogeneous liquid crystal alignment state is developed satisfactorily so as to provide a high contrast, and the movement of liquid crystal molecules during drive is suppressed, to prevent the deterioration in display quality even after a long period of use.

A more specific object of the present invention is to provide a liquid crystal device wherein the local change in liquid crystal layer thickness is prevented to retain a good switching characteristic even after a long period of use.

Another object of the present invention is to provide a process for producing a liquid crystal device as described above.

According to the present invention, there is provided a liquid crystal device, comprising: a pair of substrates, and a chiral smectic liquid crystal disposed between the substrates; wherein at least one of the substrates is provided with an alignment control film of a polyimide which has been formed by subjecting a film of a polyimide precursor to a uniaxial aligning treatment and then baking the film.

According to another aspect of the present invention, there is provided a process for producing a liquid crystal device, comprising the steps of:

forming a film of a polyimide precursor on a substrate, subjecting a surface of the film to a uniaxial aligning treatment and then baking the film to form an alignment control film, disposing a pair of substrates including the substrate having the alignment control film opposite to each other with a spacing therebetween to form a cell, and injecting a liquid crystal into the spacing between substrates of the cell.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a schematic view of a liquid crystal device for illustrating a manner of evaluating a liquid crystal molecular movement together with two voltage waveforms used therefor, respectively, in an experimental example described hereinafter.

DESCRIPTION OF THE PREFERRED EMBODIMENTS

Figure 1A:
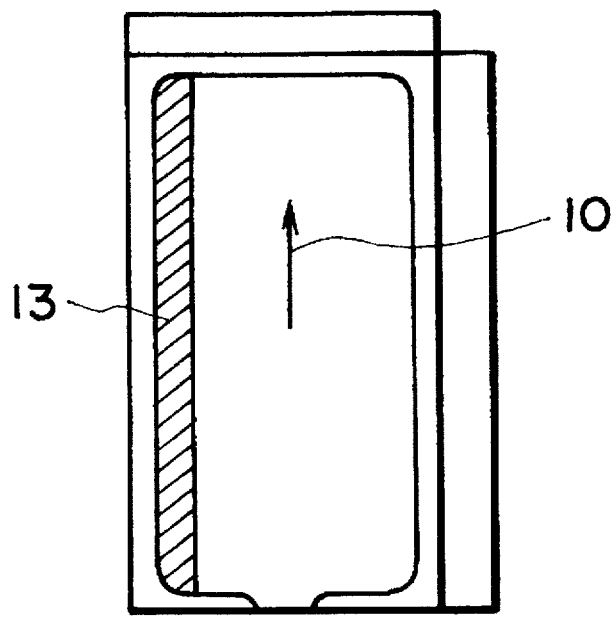
FIGS. 1A and 1B are schematic views for illustrating a liquid crystal molecular movement.
Figure 1B:
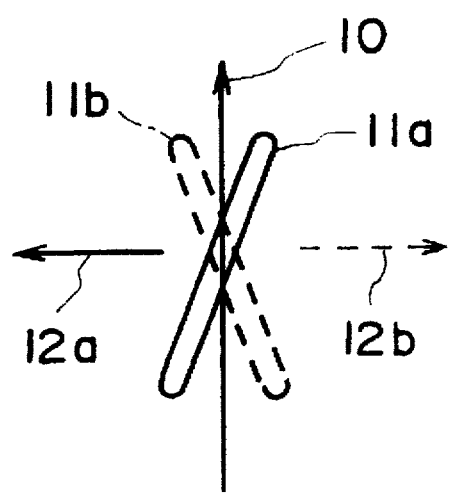
Figure 2:
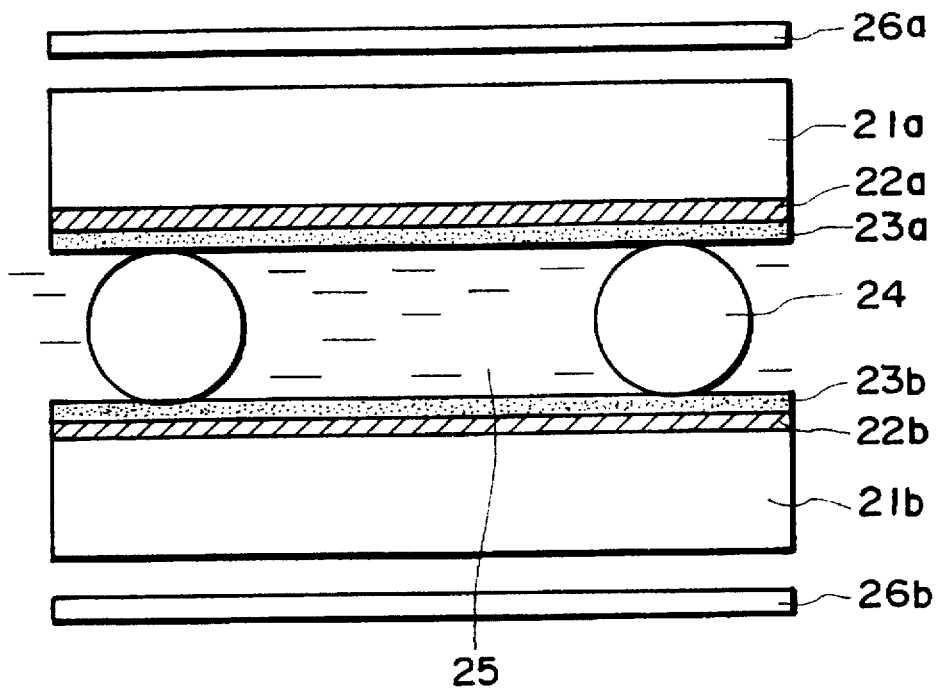
FIG. 2 is a sectional view for illustrating a structure adopted in an embodiment of the liquid crystal device according to the invention.

FIG. 2 shows a structure adopted in an embodiment of the liquid crystal device according to the present invention. Referring to FIG. 2, the liquid crystal device includes a pair of substrates 21a and 21b having successively thereon transparent electrodes 22a or 22b and an alignment control layer 23a or 23b, and a chiral smectic liquid crystal 25 and spacer beads 24 disposed between the substrates.

The liquid crystal device according to the present invention is most characterized by the alignment control layers 23a and/or 23b.

We have had a knowledge that the direction and rate of liquid crystal molecular movement during a long-term drive of a chiral smectic liquid crystal device are closely related with external factors such as a temperature and intensity and frequency of electric field applied to the liquid crystal device. The movement has been also found to depend on internal factors of a cell, such as angle and direction of pretilt at the substrate boundaries, alignment state and other properties, such as magnitude of spontaneous polarization Ps, magnitude of cone angle ⒽⒺ corresponding to the tilt angle of a chiral smectic liquid crystal, and smectic layer inclination angle δ of chiral smectic liquid crystal molecules.

Among these factors, the temperature, electric field intensity and electric field frequency have a relationship of trade off with a factor, such as Ps, affecting the response speed and are constrained by design factors, such as frame frequency and duty ratio of a liquid crystal apparatus, such as a display apparatus using the liquid crystal device, so that it is difficult to make a remarkable improvement based on these factors.

Accordingly, we have made extensive study by independently changing properties of liquid crystal materials and device design factors inclusive of alignment properties such as a pretilt angle α. As a result, it has been found possible to obtain a uniform alignment state stably providing a high contrast and also suppress the liquid crystal molecular movement during a certain period of drive of a liquid crystal device by controlling the directionality of pretilt and smectic layer inclination angle.

More specifically, according to the present invention, the alignment control layer of at least one substrate constituting a liquid crystal device, e.g., the alignment control layer 23a and/or 23b in the device shown in FIG. 2, is formed by a sequence of forming a film of a polyimide precursor, subjecting the film to a uniaxial aligning treatment and then baking the film to provide a polyimide alignment film. As a result, the alignment control force relating to pretilt is reduced at least macroscopically, thereby reducing the liquid crystal movement determined by the directionality of pretilt without impairing the homogeneous alignment characteristic of the liquid crystal.

A principal concern of the present invention is to reduce the pretilt as a factor determining the direction and amount of liquid crystal molecular movement during drive caused by a uniaxial aligning treatment (typically, rubbing), thereby suppressing the liquid crystal movement to retain a good display performance over a long period of drive. However, a uniaxial aligning treatment (e.g., rubbing) is indispensable so as to realize a homogeneous alignment so that also the occurrence of pretilt is inevitable.

As a result of our study so far, in a liquid crystal cell using a polyimide alignment film, the pretilt of a cell prepared by using a polyimide alignment film formed through a sequence of subjecting a film of a polyimide precursor (e.g., a polyamic acid) to a uniaxial aligning treatment and then baking the film becomes a half or less of the pretilt of a cell using a pollyimide alignment film formed through a conventional sequence of baking a polyimide precursor film and then subjecting the resultant polyimide film to a uniaxial aligning treatment. In this instance, the uniaxial alignment performance of the resultant cell is not substantially different from that in the cell prepared by using the polyimide alignment film formed through the conventional sequence.

This is presumably because macroscopic grooves and the stretching effect given by a uniaxial aligning treatment (particularly, rubbing) are retained after the baking but a microscopic surface structure resulting from, e.g., a difference between mutually opposite two directions of rubbing and governing the pretilt is reduced by the baking. As a result, the pretilt may be reduced to suppress the liquid crystal movement while retaining the uniaxial alignment performance.

In this instance, the percent conversion to a polyimide of the polyimide precursor in the alignment control layer may be determined appropriately depending on the kinds of a liquid crystal material used and other members.

As the uniaxial aligning treatment applied to the alignment control layers 23a and/or 23b, the oblique vapor deposition method may be applicable in addition to the above-mentioned rubbing method.

In the present invention, it is preferred to apply two times of uniaxial aligning treatment, particularly preferably rubbing, to a substrate in mutually opposite directions including a first treatment in a forward direction and a second treatment in a reverse direction so as to cancel the directionalities of the two times of treatment with each other thereby providing a reduced average pretilt of preferably at most 2 degrees, more preferably almost 0 degree, whereby the liquid crystal movement is suppressed. More specifically, the rubbing in forward and reverse two directions provides almost the same number of liquid crystal molecules inclined at several degrees respectively in the corresponding two directions to provide an absolute value of average pretilt angle of substantially at most 2 degrees, preferably about 0 degree, to substantially cancel the directionalities of the pretilt. In this way, the controlling force relating to the pretilt is removed thereby reducing the liquid crystal movement arising therefrom.

The rubbing intensity ratio between the rubbings in mutually two opposite directions should be controlled within an appropriate range, which may be referred to as a rubbing margin. A larger rubbing margin is preferred from the viewpoint of production.

The above rubbing margin is believed to be enlarged if the rubbing in mutually opposite two directions is applied to a polyimide precursor film and then baking the film to provide a polyimide alignment film.

The liquid crystal device of the present invention may suitably be applied to a chiral smectic liquid crystal having at least two stable states, particularly a ferroelectric liquid crystal, so as to provide a uniform alignment state selected from the uniform alignment state and a splay alignment state, in order to ensure an alignment state providing a display device with improved brightness and contrast.

The uniform alignment state is characterized by a relationship of $(H)/2<\theta a \leq (H)$ representing a switching condition determined by a liquid crystal material and an alignment state, wherein θa represents an apparent tilt angle which is a half of an angle between the two stable states of the liquid crystal, and $(H)$ represents a tilt angle (cone angle) $(H)$ which is a half of cone apex angle of a chiral smectic liquid crystal in a bulk helical state, i.e., a physical property of the chiral smectic liquid crystal.

Figure 3:
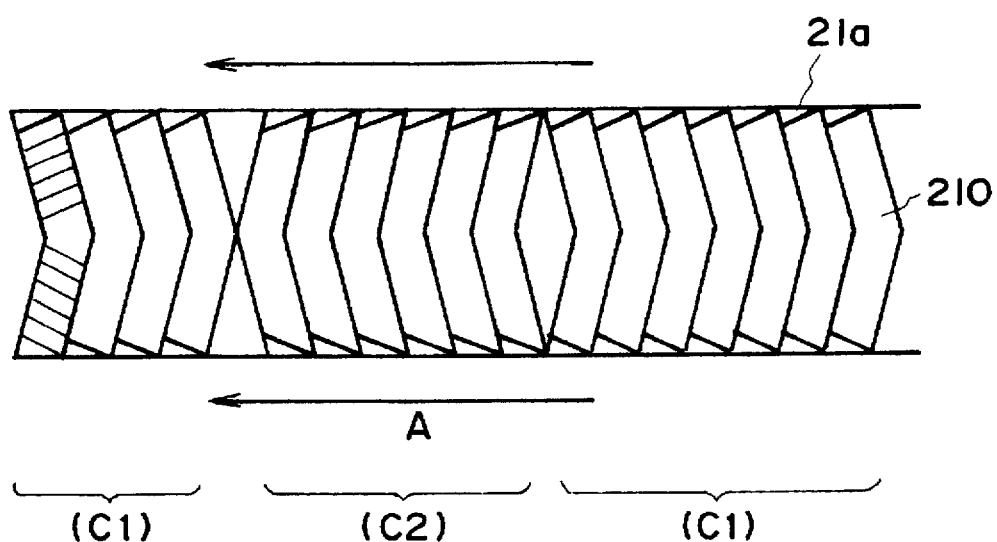
FIG. 3 is a schematic view of a state of a chiral smectic liquid crystal for illustrating C1 alignment and C2 alignment.
Figure 4A:
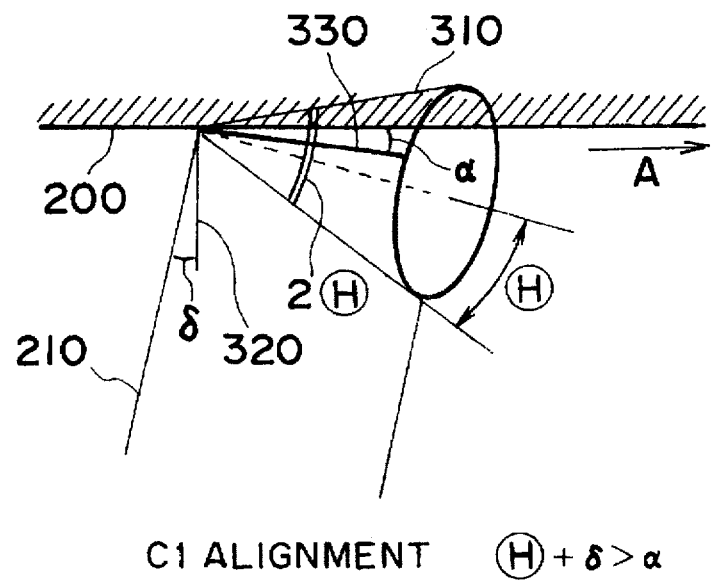
FIGS. 4A and 4B are schematic views for illustrating liquid crystal alignment states in the vicinity of a substrate boundary in C1 alignment and C2 alignment, respectively.
Figure 4B:
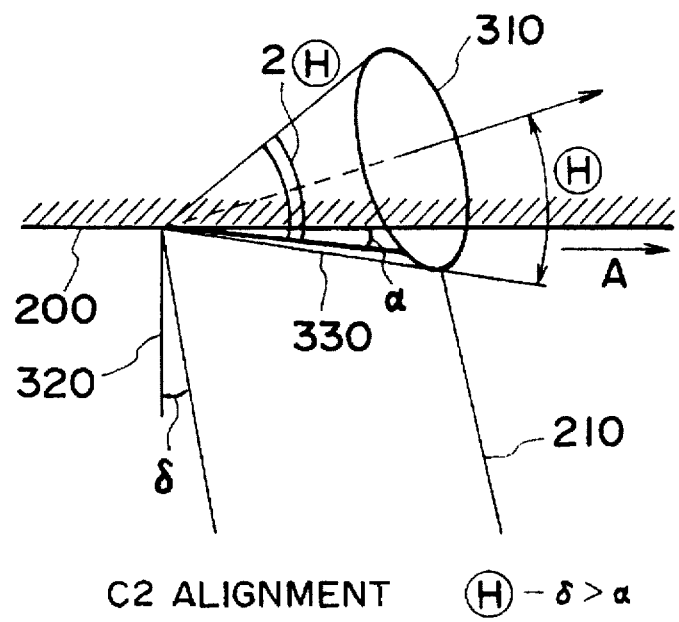

On the other hand, it is also known that a chiral smectic liquid crystal in the uniform alignment state can assume C1 alignment (state) and/or C2 alignment (state) as shown in FIG. 3 and FIGS. 4A and 4B.

More specifically, a chiral smectic liquid crystal generally has a (smectic) layer structure including a plurality of (smectic) layers each composed of plural molecules, and the smectic layer thickness (generally called "layer spacing") may shrink when it is cooled to cause a phase transition from SmA (smectic A) phase to SmC (smectic C) phase or SmC* (chiral smectic C) phase, thereby forming a structure (so-called "chevron structure") wherein the smectic layers 210 are bent at a mid point between the substrates 21a and 21b as shown in FIG. 3, while the above tendency can depend on a liquid crystal material used. In the chevron structure, there arise two liquid crystal alignment states (C1 alignment (42) and C2 alignment (43)) which are distinguished from each other by a difference in bending direction of the above-mentioned smectic layer 210 bending relative to the direction of liquid crystal molecular pretilt as shown in FIGS. 3, 4A and 4B).

Further to say, liquid crystal molecular directors 330 in the vicinity of C1 alignment and C2 alignment are present on cones 310 shown in FIGS. 4A and 4B, respectively. As a result of rubbing, a liquid crystal molecule at a substrate boundary forms a pretilt angle α (angle between a substrate 200 and a liquid crystal molecule 330) so that it raises its head in the direction of rubbing (i.e., the direction of uniaxial alignment treatment A shown in FIGS. 3, 4A end 4B). As a result, the following relationship should be satisfied among the liquid crystal cone angle $(H)$, pretilt angle α and a layer inclination angle δ (angle between a substrate normal 320 and a liquid crystal (or smectic) layer 210 shown in FIGS. 4A and 4B).

For C1 alignment: $(H)+\delta > \alpha$,

For C2 alignment: $(H)-\delta > \alpha$.

In the present invention, in view of the above characteristic feature that at least one substrate is provided with a specific alignment control layer so as to reduce the pretilt of liquid crystal molecules thereby providing an average pretilt angle of substantially zero, the device conditions, such as a liquid crystal material, are set so as to allow both of the C1 alignment and C2 alignment, reduce the average inclination angle of smectic layers due to co-presence of C1 and C2 alignments and provide a substantially homogeneous alignment state. More specifically, the parameters $(H)$, δ and α are set to satisfy: $(H) > \alpha + \delta$ so as to also allow C2 alignment, by selecting device factors, particularly a liquid crystal material. It is further preferred to satisfy $(H)/2 > \alpha + \delta$ in order to stably form a uniform alignment state.

Incidentally, in the present invention, the pretilt angle α represents an average pretilt angle $\alpha_{av}$ attained by the above-mentioned aligning treatment in forward and reverse directions, if the condition of $(H) > \alpha + \delta$ is satisfied.

Thus, in the liquid crystal device according to the present invention, the inclination angle δ in a smectic liquid crystal device is substantially reduced to provide a high brightness and a high contrast.

Hereinafter, some other device features will be described with reference to the embodiment shown in FIG. 2.

The liquid crystal material (25 in FIG. 2) used in the present invention may be a chiral smectic liquid crystal material, i.e., a liquid crystal material having a chiral smectic phase inclusive of chiral smectic C phase (SmC*) as a representative and also chiral smectic H phase (SmH*), I phase (SmI*), K phase (SmK*) and G phase (SmG*) which may be also represented by SmC* in some cases. The chiral smectic liquid crystal may preferably be placed in an alignment state showing at least two stable states. More specifically, the liquid crystal material may for example comprise a composition including, as a principal constituent, a mesomorphic compound having a biphenyl skeleton or a phenylpyrimidine skeleton as a mesogen group and various hydrocarbon groups optionally substituted with a halogen as side or terminal chains, and also at least one species of chiral dopant.

Further, it is preferred to use a liquid crystal material showing a small layer inclination angle δ and a large cone angle $(H)$. Examples of such a liquid crystal material may include those showing no or only suppressed cholesteric (Ch) phase. More specific examples of such a liquid crystal material may include mesomorphic compounds having a naphthalene skeleton as disclosed in JP-A 1-193390 and JP-A 63-233932, and mesomorphic compounds having a perfluorocarbon chain group in their side chain.

At least one of the substrates 21a and 21b should be transparent and may for example comprise glass (as a preferred example), a polymer, quartz, Si, metal such as Al, a semiconductor or an insulating material. The transparent electrodes 22a and 22b may for example comprise tin oxide, indium oxide, or indium tin oxide (ITO).

The spacer 24 may comprise fine particles of, e.g., alumina or silica. A periphery of the pair of substrates may be sealed with a sealing member (not shown) of, e.g., an epoxy resin to provide a cell structure, which is filled with the liquid crystal 25.

The thus-formed liquid crystal cell structure is sandwiched between a pair of polarizers 26a and 26b. A backlight (not shown) may be further provided outside one of the polarizers 26a and 26b in order to provide a transmission-mode device.

Incidentally, in the liquid crystal device of the above-described structure, it is possible to provide only one of the substrates 21a and 21b with a specific alignment control layer 23a or 23b as described above and combine it with the other substrate having a surface of a non-uniaxially aligning characteristic, e.g., a film comprising a material of the same or different species as the layer 23a or 23b not subjected to a uniaxial aligning treatment. Thus, it is possible to provide a liquid crystal device including a liquid crystal disposed in a defect-free, homogeneous alignment state even by using a liquid crystal material assuming no cholesteric phase.

The liquid crystal device of the present invention having the above-described structure may be prepared through a process as described below. A substrate is provided with electrodes and another functional layer, such as a color filter layer and/or an insulating layer for short circuit prevention, as desired, and then coated with a film of a polyimide precursor, followed by a uniaxial aligning treatment and baking, according to a sequence as described above, to form a polyimide alignment control layer. A pair of substrates including at least one of the above-treated substrate are disposed opposite to each other and applied to each other with a prescribed gap therebetween to form a blank cell, which is then filled with a liquid crystal (chiral smectic liquid crystal) material, e.g., in its isotropic phase and, after sealing, is gradually cooled, to provide a liquid crystal device.

The parameters of pretilt angle α (=|α$_{AV}$|) and layer inclination angle δ discussed herein were measured in the following manner and the degree of liquid crystal molecular movement was evaluated in the following manner.

Pretilt angle α

The measurement was performed according to the crystal rotation method as described at Jpn. J. Appl. Phys. vol. 19 (1980), No. 10, Short Notes 2013. A scruple cell was prepared by applying a pair of substrates each other so that the inclination of liquid crystal at the boundaries with two substrates were parallel and identical to each other, and the cell was then filled with a liquid crystal mixture assuming SmA phase in the temperature range of 10°–55° C. obtained by mixing 80 wt. % of a ferroelectric liquid crystal ("CS-1014", mfd. by Chisso K. K.) with 20 wt. % of a compound represented by the following formula:

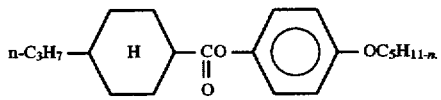

Layer inclination angle δ in SmC* phase

A liquid crystal cell having a structure according to the present invention was prepared by using ca. 70 μm-thick glass sheets and then filled with a chiral smectic liquid crystal and cooled for alignment. The resultant cell was subjected to an ordinary X-ray diffraction analysis to evaluate a layer inclination angle δ.

Liquid crystal molecular movement

The measurement method will be described with reference to FIG. 5 showing a schematic plan view of a sample liquid crystal cell on the left side and signals applied to the sample cell on the right side.

A pair of substrates prepared by a method (according to or not according to the present invention) are applied to each other so that an aligning treatment direction 50 is disposed perpendicular to printed mutually parallel stripe spacers 53, and a gap therebetween is filled with a liquid crystal without sealing on both sides to form a sample cell. Then, silicone oil 54 is dripped on both unsealed sides as a marker or indicator of liquid crystal molecular movement, and a writing waveform 52a or 52b (pulse voltage=20 volts and pulse width 1.2 times the threshold (bias ratio=½, duty ratio= ¹⁄₁₀₀₀) as shown in FIG. 5 on the right side applied to the cell so that the resultant liquid crystal molecular axis is aligned in a direction 51a or 51b as shown in FIG. 5. When the liquid crystal molecular movement is caused as a result of the drive, the silicone oil is pulled into the cell to indicate the degree of the liquid crystal movement. In the experiments described hereinafter, the rate of liquid crystal molecular movement was evaluated from the distance of the marker introduced into the cell within 5 hours.

Now, the present invention will be described more specifically based on experimental examples.

EXAMPLE 1

A liquid crystal device having a structure as shown in FIG. 2 was prepared. Two 1.1 mm-thick glass substrates each provided with a ca. 700 nm-thick ITO transparent electrode film were respectively coated with a 0.7 wt. % solution in an NMP/nBC (=2/1) mixture solvent of a polyamic acid ("LP-64", mfd. by Toray K. K.) dripped thereon by spin coating at 2700 rpm for 20 sec., followed by drying at 80° C. for 1 hour to form a 5 nm-thick polyamic acid film.

A pair of substrates each provided with a polyamic acid film in the above-described manner were subjected to an aligning treatment by rubbing with nylon cloth wound about a rubbing roller. Each substrate was rubbed at a rubbing intensity RS (=NM (2 πrn/V−1))=110, wherein N: a number of rubbing applied to a substrate (times), M: a pressing depth of the rubbing roller against the substrate (mm), r: a radius of the rubbing roller (mm), n: a rotation speed of the rubbing roller (RPM), and V: a substrate feed rate (mm/min).

Then, the substrates having the polyamic acid film subjected to rubbing were baked at 270° C. for 1 hour to cause polyimidation.

Then, onto one of the pair of substrates subjected to the above aligning treatment, silica beads having an average particle size of 1.5 μm were dispersed, and the other substrate was superposed thereon so that their rubbing directions were parallel and identical to each other to form a cell.

Then, the cell was filled with a mixture liquid crystal A showing a phase transition series of Cry→SmC*→SmA→Iso. on temperature increase, a tilt angle (cone angle) Ⓗ of at least 25 degrees, an apparent tilt angle θa of at least 20 degrees, a spontaneous polarization (Ps) of 20 μC/cm² and a smectic layer inclination angle δ of 6.5 degrees, respectively, in chiral smectic phase at 30° C. The filling was performed with the mixture liquid crystal A in isotropic phase, and the resultant cell was gradually cooled at a rate of 0.5° C./min to room temperature to effect alignment. The cell thus prepared is referred to as Cell A.

Cell B for comparison was prepared in the same manner as in the preparation of Cell A except that polyamic acid films were first baked for polyimidation and the resultant polyimide films were then rubbed to form alignment control layers.

Sample cells for the pretilt angle measurement were prepared under the conditions corresponding to preparation of Cells A and B, and the pretilt angles were measured according to the crystal rotation method at α=ca. 1.2 degrees for the sample cell corresponding to Cell A and at α=ca. 2.6 degrees for the sample cell corresponding to Cell B.

Further, Cells A and B were subjected to measurement of liquid crystal movement rate whereby Cell A showed a rate of ca. 1.0 mm/hour and Cell B showed a rate of 10.0 mm/hour, so that Cell showed a movement rate suppressed to ¹⁄₁₀.

EXAMPLE 2

Eighteen Cells C (C1–C18) were prepared in the same manner as in the preparation of Cell A in Example 1 except that the respective substrates were rubbed first in a forward direction at a uniform rubbing intensity RSI=110 and then in a reverse direction at varying rubbing intensities RS2=30, 25, 20, 15, 12, 10, 8, 7, 6, 5, 4.5, 4, 3.5, 3, 2.5, 2, 1.5 and 1.

Further, eighteen Cells D (D1–D18) were prepared in the same manner as Cells C except that polyamic acid films were first baked for polyimidation and the resultant polyimide films were then rubbed to form AC layers similarly as the preparation of Cell B.

Sample cells for the pretilt angle measurement according to the crystal rotation method were prepared under the conditions corresponding to preparation of Cells C and Cells D. As a result of the measurement, the pretilt angle $\alpha$ satisfied $\alpha \leq 1.0$ for Cells C prepared in a reverse direction rubbing intensity range of $2.5 \leq RS2 \leq 20$ and satisfied $\alpha \leq 0.5$ degree for Cells C prepared in a range of $3 \leq RS2 \leq 7$. On the other hand, Cells D provided pretilt angles $\alpha$ satisfying $\alpha \leq 1.0$ degree for samples prepared in a reverse direction rubbing intensity range of $4 \leq RS2 \leq 7.5$ and $\alpha \leq 0.5$ only for a sample prepared at $RS2=5$.

Cells C were subjected to measurement of liquid crystal movement rate whereby those prepared in a rubbing margin of $11 \leq RS1/RS2 \leq 44$ ($2.5 \leq RS2 \leq 10$) showed no observable liquid crystal movement within 5 hours.

On the other hand, according to the same measurement, Cells D prepared in a rubbing margin of $18.3 \leq RS1/RS2 \leq 24.4$ ($4.5 \leq RS2 \leq 6$) showed no observable liquid crystal movement within 5 hours. Thus, Cells C showed a rubbing margin which was increased to 5 times or more compared with Cells D.

As described above, the liquid crystal device according to the present invention showed a suppressed liquid crystal movement causing a change in liquid crystal layer thickness and also shows a good switching characteristic, thus being expected to be used as a high-contrast light valve or display device. Further, the liquid crystal device can be prepared in a simple manner comparable with the conventional process.

What is claimed is:

1. A liquid crystal device, comprising: a pair of substrates, and a chiral smectic liquid crystal disposed between the substrates; wherein at least one of the substrates is provided with an alignment control film of a polyimide which has been formed by subjecting a film of a polyimide precursor to a uniaxial aligning treatment and then baking the film.

2. A device according to claim 1, wherein said uniaxial aligning treatment comprises rubbing.

3. A device according to claim 1, wherein said uniaxial aligning treatment comprises rubbing a substrate in mutually substantially opposite two directions.

4. A device according to claim 1, wherein said chiral smectic liquid crystal is disposed in an alignment state satisfying a relationship of $\textcircled{H} > \alpha + \delta$, wherein $\textcircled{H}$ denotes a tilt angle of the chiral smectic liquid crystal, $\alpha$ denotes a pretilt angle and $\delta$ denotes an angle of inclination of smectic layers of the liquid crystal with respect to a normal of a substrate.

5. A device according to claim 1, wherein said chiral smectic liquid crystal is disposed in an alignment state satisfying a relationship of $\textcircled{H}/2 > \alpha + \delta$, wherein $\textcircled{H}$ denotes a tilt angle of the chiral smectic liquid crystal, $\alpha$ denotes a pretilt angle and $\delta$ denotes an angle of inclination of smectic layers of the liquid crystal with respect to a normal of a substrate.

6. A device according to any one of claims 1–5, wherein said liquid crystal is disposed in an alignment state wherein liquid crystal molecules are aligned to provide an absolute value of pretilt angle $\alpha$ of at most 2 degrees.

7. A process for producing a liquid crystal device, comprising the steps of:

forming a film of a polyimide precursor on a substrate, subjecting a surface of the film to a uniaxial aligning treatment and then baking the film to form an alignment control film, disposing a pair of substrates including the substrate having the alignment control film opposite to each other with a spacing therebetween to form a cell, and injecting a liquid crystal into the spacing between substrates of the cell.

8. A process according to claim 7, wherein said uniaxial aligning treatment comprises rubbing.

9. A process according to claim 7, wherein the substrate is rubbed in mutually substantially opposite two directions.

10. A process according to claim 7, wherein said liquid crystal is a liquid crystal showing a chiral smectic phase.

11. A process according to claim 10, wherein said pair of substrates are disposed so that the liquid crystal assumes an alignment state satisfying a relationship of $\textcircled{H} > \alpha + \delta$, wherein $\textcircled{H}$ denotes a tilt angle of the chiral smectic liquid crystal, $\alpha$ denotes a pretilt angle and $\delta$ denotes an angle of inclination of smectic layers of the liquid crystal with respect to a normal of a substrate.

12. A process according to claim 10, wherein said pair of substrates are disposed so that the liquid crystal assumes an alignment state satisfying a relationship of $\textcircled{H}/2 > \alpha + \delta$, wherein $\textcircled{H}$ denotes a tilt angle of the chiral smectic liquid crystal, $\alpha$ denotes a pretilt angle and $\delta$ denotes an angle of inclination of smectic layers of the liquid crystal with respect to a normal of a substrate.

13. A process according to any one of claims 7–9, 11, and 12, wherein said liquid crystal is disposed in an alignment state wherein liquid crystal molecules are aligned to provide an absolute value of pretilt angle $\alpha$ of at most 2 degrees.

14. A process according to claim 10, wherein said liquid crystal is a liquid crystal showing no cholesteric phase.

15. A process according to claim 14, wherein only one of the pair of substrates has the alignment control film subjected to the uniaxial aligning treatment.

16. A process according to claim 10, wherein said liquid crystal comprises a mesomorphic compound having a naphthalene skeleton.

17. A process according to claim 10, wherein said liquid crystal comprises a mesomorphic compound having a perfluoro-carbon chain as a terminal chain.

18. A process according to claim 7, wherein each of the pair of substrates has the alignment control film subjected to the uniaxial aligning treatment.

* * * * *